Aug. 9, 1960  J. S. JACOBSON  2,948,187
PICTURE PROJECTION SCREENS
Filed June 16, 1955  2 Sheets-Sheet 1

Aug. 9, 1960   J. S. JACOBSON   2,948,187
PICTURE PROJECTION SCREENS
Filed June 16, 1955   2 Sheets-Sheet 2

United States Patent Office 2,948,187
Patented Aug. 9, 1960

2,948,187

PICTURE PROJECTION SCREENS

Johan S. Jacobson, The Hague, Netherlands, assignor of part interest to N.V. Exploitatie Maatschappij "Het Hof van Holland," Amsterdam, Netherlands, a company of the Netherlands Filed June 16, 1955, Ser. No. 515,810

Claims priority, application Netherlands June 28, 1954

1 Claim. (Cl. 88—28.93)

The invention relates to a picture projection screen consisting of a plate or foil of transparent material of which at least one of the surfaces is provided with irregularities in the form of projections and depressions. Projection screens of this type are known per se and can be used by daylight, for instance, for advertisement purposes. In this case, the projected image is viewed from the side of the screen which is opposite to the side facing the projector.

A disadvantage of these known screens is that they do not regularly spread the light. Owing to the profile of the wave-shaped irregularities used in said screen, large areas thereof are parallel or substantially parallel to the plane surface of the screen. The effect thereof is that the spectator receives very much light in directions which are substantially perpendicular to the screen whereas in oblique directions the light intensity is considerably less.

An object of the invention is to avoid the above mentioned disadvantage of known picture projection screens. To this end the invention proposes that the profile of each of said irregularities is made in the shape of a laterally crushed wave-line, in such a manner, that the areas at the crests and the troughs of the undulations, in which the angle enclosed between the tangent plane to the profile and the plane of the plate or foil is less than 5°, are considerably smaller than said areas would be should the surface in question be completely sinusoidally curved, and the maximum slope of the tangent plane intermediate the crests and the troughs of the undulations is smaller than the limit-angle of total reflection. In this way a plate is obtained, which has no parts or, measured in units of area, has only very small parts, in which the tangent plane to the irregularities is substantially parallel to the plane surface of the plate. The result thereof is that the beams of light are regularly spread or distributed over a large angle, which is determined by the maximum slope of the profile intermediate the crests and the troughs. The surplus of light in the direction perpendicular to the screen occurring in all hitherto known systems of projection by means of transmitted light is thus avoided. Said light is now distributed in directions which enclose a larger angle with said perpendicular direction.

For further explanation, reference is made to the accompanying drawing which illustrates, by way of example, some embodiments of the invention.

Figure 1:
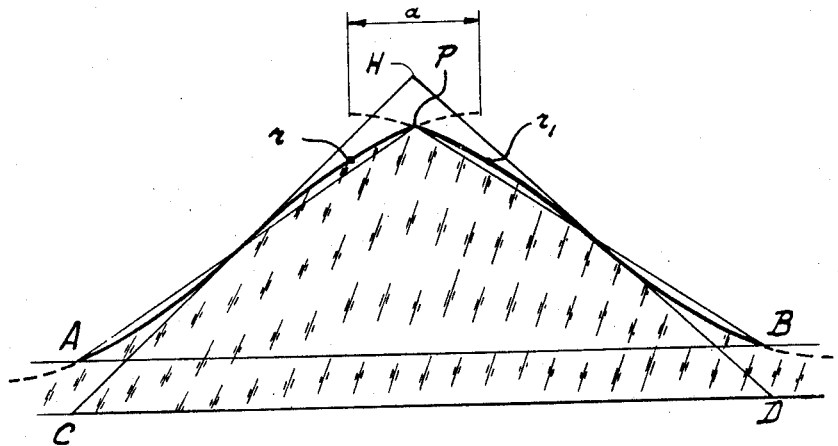
Fig. 1 is, on an enlarged scale, a cross-sectional view of an irregularity or protrusion formed in accordance with the invention on either of the surfaces of a picture projection screen.

In Fig. 1, two sine curves are designated as $r$ and $r'$. The portions of these curves indicated by $a$ are removed from each sine curve so as to obtain at P a point of intersection of said curves. H indicates the point of intersection of the two lines CH and DH, which are tangent to the mid-points of said curves. The angles HCD and HDC are smaller than the limit-angle of total reflection of the material from which the screen is manufactured.

Fig. 1 shows that in the illustrated wave-shaped profile the portions of the crests and the troughs, in which the deviation from the plane surface of the screen is less than 5°, have a considerably smaller area than corresponding portions of a complete sinusoidal surface. In this way a regular spreading and distribution of the light are obtained and it is prevented thereby that too much light is let through within a small angle. In Fig. 1 the flanks $r$ and $r'$ of the profile are equal and have the same slope with respect to the line AB. However, this is not necessary, since it is often preferred to construct the flanks $r$ and $r'$ of the profile on different scales and to give the lines AP and BP different positions, in such a manner, that they enclose different angles with the line AB. The omission of the area $a$ at the crests of the sine curve will also be found in the troughs thereof.

Figure 2:
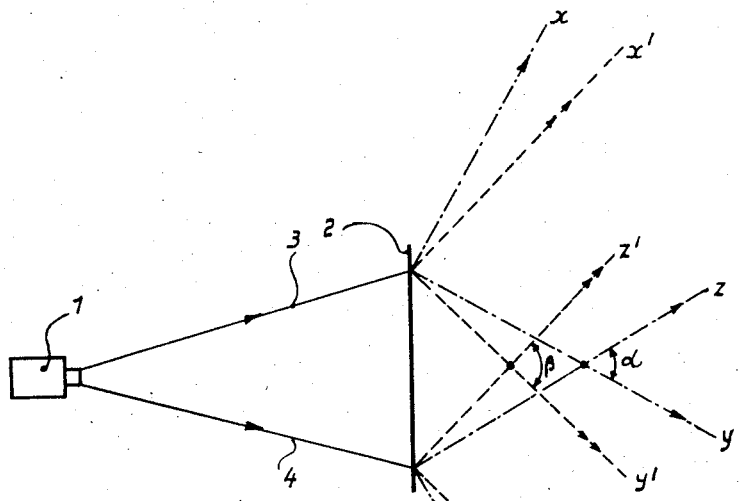
Fig. 2 illustrates the arrangement of a screen and a projector in which arrangement the screen is preferably provided, in accordance with the invention, with a roughened surface.

In Fig. 2, a projector 1 and vertical projection screen 2 are shown. The narrow beam of light 3 would normally be spread, due to the effect of the surface irregularities of the screen 2, within the angle enclosed between the rays $x$ and $y$. When, however, in accordance with the invention the profile of said irregularities is somewhat tilted with respect to the plane of the screen, that means in the present case with respect to the vertical plane, the spreading or distribution takes place between the extreme rays $x'$ and $y'$. The same applies to the spreading of the narrow beam of light 4, which, owing to the tilted position of the profile, is shifted from $z-u$ to $z'-u'$. The result is that a larger angle of vision is possible since the angle $\beta$ is larger than the angle $\alpha$. Further, less light is lost in downward and upward directions and, finally, it will be possible to view the entire image at a smaller distance from the screen. By means of variation of the angle of tilting of the profile from point to point it is possible to obtain the desired maximum angle of vision, the required distribution of light and a suitable minimum distance between the spectator and the screen. Besides, since it is possible to offset or tilt the profile as desired, the lateral loss of light can also be restricted without the loss of the above mentioned advantages.

Figure 3:
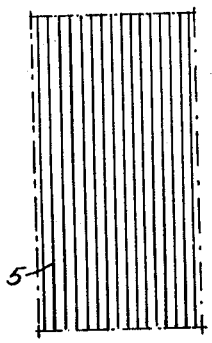
Figs. 3 and 4 show examples of areas of projection screens having surfaces provided with projections arranged along vertical and substantially vertical lines.

Fig. 3 shows a portion of a screen made in accordance with the invention and provided with vertical ribs 5 or rows which are shaped as illustrated in Fig. 1. This screen gives a spreading of light in a horizontal direction.

Figure 4:
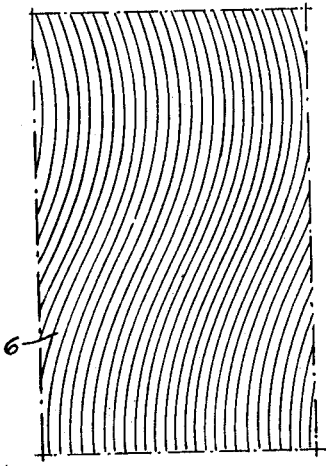

The screen according to Fig. 4 has curved ribs 6 and spreads the light both in horizontal and vertical directions although less in the latter direction.

Figure 5:
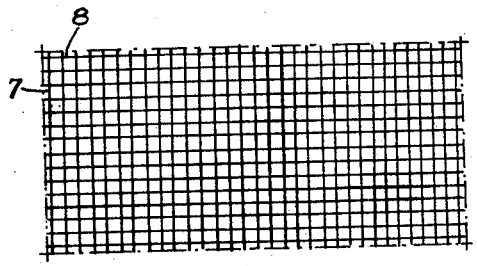
Fig. 5 is a view of the surface of a projection screen having irregularities arranged along both horizontal and vertical lines.

The screen illustrated in Fig. 5 has vertical and horizontal elements 7 and 8 respectively, and causes a spreading of light both in horizontal and in vertical directions. The degrees of spreading in these directions may be equal or different depending on the angle APB (see Fig. 1). In this case the irregularities have the shape of a pyramid.

Figure 6:
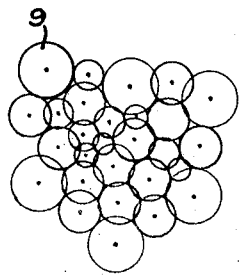
Figs. 6 and 7 illustrate areas of projection screens, in which projections of different shapes and sizes are differently arranged.

Fig. 6 shows an example of a screen, in which the projections 9 have the shape of a surface of revolution of the curve of Fig. 1 about an axis perpendicular to the screen. If desired, the thus obtained conically shaped projections may be tilted about an inclined axis or in the manner described in connection with Fig. 2. However, plane areas between the conically shaped projections will have to be avoided by the provision of surface projections of different sizes at different levels.

Figure 7:
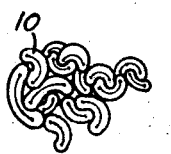

It will be apparent that the profiles may be orientated in many other ways. For example, it is very effective to make a surface of a screen from curved projections 10 engaging each other in the manner shown in Fig. 7.

It may be observed that screens can be manufactured in many ways known per se such as by molding, casting, pressing, milling and as forth. The screen may be constructed as a plate, a foil, a film or the like.

What I claim is:

A picture projection screen for images which can be viewed from the side of the screen turned away from a projector comprising a sheet of light permeable material, projecting portions on at least one of the sides of the sheet and having contacting bases, said projecting portions having flanks, the generatrices of which are each a portion of a sine curve, the latter said portion being less than the full sine curve and including the point of inflection of said curve and extending between points at which the tangents to the sine curve enclose with the sheet angles of at least 5° so that the portions of each sine curve substantially parallel to the sheet are omitted, the tangent to said curve at the point of inflection thereof enclosing with the sheet an angle which is smaller than the critical angle of total reflection.

References Cited in the file of this patent

UNITED STATES PATENTS

| | | |
|---|---|---|
| 1,491,830 | Troeger | Apr. 29, 1924 |
| 1,597,300 | Troeger | Aug. 24, 1926 |
| 2,207,835 | Sukumlyn | July 16, 1940 |
| 2,348,818 | Jacobson | May 16, 1944 |
| 2,480,031 | Kellogg | Aug. 23, 1949 |
| 2,870,673 | Schwesinger | Jan. 27, 1959 |